United States Patent [19]

Brun et al.

[11] Patent Number: 4,467,080

[45] Date of Patent: Aug. 21, 1984

[54] PROCESS FOR POLYMERIZATION IN A GASEOUS PHASE USING HETEROGENEOUS CATALYSIS AND A SPHERICAL REACTOR FOR CARRYING OUT THE PROCESS

[75] Inventors: Claude Brun, Idron Bizanos; Robert Pelletier, Billere, both of France

[73] Assignee: Ato Chimie, Courbevoie, France

[21] Appl. No.: 444,872

[22] Filed: Nov. 29, 1982

[30] Foreign Application Priority Data

Nov. 30, 1982 [FR] France .................................. 81 22425

[51] Int. Cl.³ .............................................. C08F 2/34
[52] U.S. Cl. ..................................... 526/62; 422/131; 422/135; 422/138; 526/88
[58] Field of Search ................... 526/62, 88; 422/135, 422/225, 131, 138

[56] References Cited

U.S. PATENT DOCUMENTS 3,330,818  7/1967  Derby ................................. 526/88

Primary Examiner—Paul R. Michl
Attorney, Agent, or Firm—Brisebois & Kruger

[57] ABSTRACT

The invention relates to a process for polymerizing in an aqueous phase using heterogeneous catalysis and to a spherical reactor for carrying out said process. At least one monomer which is gaseous under the reaction conditions is just in contact with a solid catalyst in an agitated polymerization zone. The polymerization zone is defined by a spherical wall and the agitation is effected by means of a turbine unit having blades driven in rotation. The blades extend alongside the wall on 10 to 60% of its surface. The particles of the catalyst and the growing polymer powder are driven by centrifugal force onto at least a part of the spherical wall and fall back into the central part of the spherical zone, thereby ensuring a thorough and uniform mixing without any dead zone. The invention is useful for prepolymerizing or polymerizing olefins.

17 Claims, 9 Drawing Figures

PROCESS FOR POLYMERIZATION IN A GASEOUS PHASE USING HETEROGENEOUS CATALYSIS AND A SPHERICAL REACTOR FOR CARRYING OUT THE PROCESS

BACKGROUND OF THE INVENTION

1. Field of the invention

The invention relates to the field of polymerization in a gaseous phase with the use of heterogeneous catalysis. It more particularly relates to a process and a reactor for carrying out such polymerization reactions.

Many monomers may be polymerized in a gaseous phase with heterogeneous catalysis. This is in particular the case of unsaturated ethylenically insaturated hydrocarbons and in particular olefins. For the homopolymerization as well as the copolymerization reactions, the monomer is put in contact in the gaseous form with a catalyst dispersed in the solid form, so that the catalysis is heterogeneous.

In the course of the polymerization, the polymer is formed around the catalyst particles and, if the process is carried out at a temperature lower than the melting point of the polymer, a polymer powder is finally obtained. The mean particle size of the polymer powder obtained is usually larger than that of the catalyst powder.

Polymerizations in a gaseous phase are mainly carried out in reactors having a fluid bed or an agitated bed.

The apparatus employing fluid beds are not devoid of drawbacks. Indeed, it is known that the fluidization of the powders is a delicate operation which requires precise particle size distributions. The fine particles have a tendency to be carried out of the bed while the largest particles have a tendency to settle on the gas distribution grate of the reactor. The conditions of gas flow for the fluidization and the thermal exchange inside the reactors are intimately related so that the operation of the latter is not flexible. In any case, the speed of circulation of the gases must be equal to or higher than the minimum speed of fluidization. Further, the starting-up of a fluid bed reactor requires the prior charging of the reactor with a certain quantity of particulate material, essentially the polymer powder. Without this prior charging, there is not enough catalyst powder to create the fluidized bed.

Conventional apparatus for carrying out polymerization reactions with a heterogeneous catalyst are agitated bed reactors. These types of reactors may be in several forms. A good number of them are vertical; it for example concerns cylinders having a rounded bottom provided with an agitator. Horizontal reactors also exist. In any case, an initial charge of polymer powder must be used. It is difficult to achieve a well-homogeneous agitation within the reactor, so that there are increased risks of agglomeration of the growing polymer powder in the poorly agitated zones. The agitator system comprises blades and counter-blades, which creates dead zones. The agitation obtained is not uniform and homogeneous.

This problem is particularly felt when carrying out prepolymerization reactions for the purpose of controlling the particle sizes of the growing powders and controlling the extremely high initial activities of certain types of catalysts. With conventional fluid bed reactors and agitated bed reactors, the formation of hot points and agglomerates is encountered in the dead or poorly agitated zones, which renders the product heterogeneous and unsuitable for use in a main polymerization reactor.

An object of the invention is to provide an improved polymerization process in a gaseous phase and heterogeneous catalysis, in a polymerization reactor which avoids the drawbacks of the techniques of the prior art whether they concern a fluid bed or an agitated bed. In respect of the present invention, and in the ensuing specification, polymerization is intended to mean all stages of the polymerization reaction permitting the obtainment of a dry powder covering very wide particle size ranges.

Thus the described polymerization process may serve to form a prepolymer which is injectable into a second polymerization reactor. In particular, this polymerization reactor may be in a gaseous phase of the same type (agitated bed) or of another type (for example, fluid bed). The described polymerization process may also serve to form the final polymer directly in a homogeneous powdered form devoid of agglomerates.

According to the invention, the agitation is perfectly homogeneous and leaves no dead zones, which results in an excellent dispersion of the catalyst, of the growing polymer powder and of the gases of the reactor. According to the invention, it is possible to be substantially independent of the particle size of the catalysts and polymer powder, and consequently be able to employ a much wider range of solid catalysts. The invention enables the polymerization to be started up with a very small, and even zero, charge of powder if necessary.

In its most general form, the invention provides a polymerization process in a gaseous phase with the use of heterogeneous catalysis by putting at least one monomer, which is gaseous under the conditions of the reaction, in contact with a solid catalyst in an agitated polymerization zone, wherein there is employed a polymerization zone defined by a spherical wall and the agitation is produced by means of a turbine unit having blades and driven in rotation, said blades extending along said wall in the 10 to 60% of its surface, the particles of the catalyst and the growing polymer powder being driven by centrifugal force in at least a part of the spherical wall and dropping into the central part of the spherical zone, thereby ensuring an through and uniform mixing without dead zones.

The invention is essentially applicable to polymerizations in a gaseous phase with the use of heterogeneous catalysis. This definition implies that it is possible to emply a large variety of monomers capable of being put into the gaseous form under the polymerization conditions prevailing within the reactor. Liquefiable monomers may also be introduced by injecting them under pressure in the polymerization zone. In the latter, the liquefiable monomers vaporize so that the monomer or the comonomer is in a gaseous phase in the polymerization reaction. The gaseous atmosphere of the reactor may possibly contain gases which are inert concerning the polymerization reaction and gases acting on the transfer reactions. High proportions of inert gases are employed with low partial pressures of monomer(s), in particular when the reactor operates for prepolymerization, so as to control the initial rates of the catalysts and the thermal exchanges.

The form of the spherical polymerization zone employed in accordance with the invention permits operating within a wide range of pressures and temperatures. It is possible to operate just as well in a vacuum or under high pressure. Possible ranges of pressure range from values lower than atmospheric pressure up to 500 atmospheres or more, the preferred range being between about 1 and 80 atmospheres. The particular conditions to be chosen will of course depend on the nature of the monomer or monomers to be polymerized.

The temperature conditions are note critical either. It is just as possible to operate below or above room temperature. Generally, the range of suitable temperatures ranges from normal temperature to 250° C. or more and is preferably between room temperature and about 150° C. Here again, it is the nature of the monomer or monomers to be polymerized or of the polymer obtained which will enable a person skilled in the art to choose the most appropriate particular temperature conditions, it being possible to carry out the invention at any usual temperature of polymerization reactions in a gaseous phase with heterogeneous catalysis.

The preferred monomers for the polymerization according to the invention are ethelynically unsaturated hydrocarbons. The new process permits in particular the polymerization of olefins and the copolymerization of olefins among each other to obtain polyolefins of variable density and structure. Apart from ethylene and propylene, which represent particularly preferred monomers, it is possible to employ various α-olefins comprising preferably 3 to 18 carbon atoms and, better still, 3 to 8 carbon atoms, including 1-butene, 1-pentene, 4-methyl-1-pentene, 1-heptene, 1-hexene, 1-octene and mixtures thereof. The copolymerization reactions which are preferred are those which employ the copolymerization of ethylene and propylene, and the copolymerization of ethylene and/or olefins of 3 to 18 carbon atoms, these being straight chain or branched chain. By way of examples, there may be mentioned 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene and mixtures thereof. Within the meaning of the present description, the expression "olefins" also covers the di-olefins and conjugated di-olefins. The dienes, such as butadiene, isoprene, 1, 4-hexadiene 1, 5-hexadiene, vinylnorbornene, ethylidenenorbornene, and dicyclopentadiene may be used to advantage as co-monomers and specially as ter-monomers in a polymerization reaction according to the invention.

The modes of introduction of the monomer(s) to be polymerized in the spherical polymerization zone will depend on the form in which these monomers are available under the conditions of temperature and pressure of the storage.

It may be of interest to introduce the monomer(s) in such manner that the pressure remains substantially constant within the polymerization zone. In the case of gaseous monomers, such as ethylene, the introduction may be controlled by known means, for example by a pressure controller provided in the monomer(s) supply means.

The liquefiable monomers, for example the 1-butene, may be continuously injected into the polymerization zone by means known to those skilled in the art, so that the pressure within the polymerization zone remains substantially constant. In small-scale plants a diaphragm pump is suitable for this purpose.

When it is desired to effect copolymerization reactions, it is advantageous to supply the monomers to be copolymerized in relatively well-defined proportions.

For this purpose it is sufficient to put the means for introducing a monomer under the control of those provided for the other monomer(s) so as to achieve the desired ratio. In the case of a mixture of gaseous ethylene and liquid 1-butene, the injection pump of the 1-butene may then be a variable output pump controlled by the signal delivered by the flow-meter furnishing information concerning the quantity of gaseous ethylene introduced. In this way, the butene/ethylene ratio is maintained constant automatically. It is also possible to emply a gas-analyzer for controlling the various flows.

All the foregoing indications concerning the nature of the monomers or co-monomers to be employed and the means for introducing them in the polymerization zone are known to those skilled in the art and have no need to be described in more detail.

The polymerization reactions are achieved with a solid catalyst preferably presented in the granular or particulate form. These catalyst systems are also well-known to those skilled in the art. In heterogeneous catalysis, in particular for the olefins, use is generally made of the supported catalysts of the Ziegler-Natta type or supported chromium with or without an appropriate co-catalyst. In catalysis of the Ziegler type, catalysts having a very high activity are preferably employed whose most conventional composition comprises a titanium compound, a magnesium compound, possibly an electron-donor organic compound and possibly a porous support of the metal oxide type. These catalysts are generally employed in the presence of co-catalysts.

Among the titanium compounds there may be mentioned among others, titanium chlorides ($TiCl_3$, $TiCl_4$) and chlorotitanates.

The magnesium compound is generally a magnesium halide; preferably $MgCl_2$.

In certain cases, complexing agents may be employed owing to their electron donor power.

Belonging to these compounds are the Lewis bases which include compounds such as the alkyl esters obtained from aromatic or aliphatic carboxylic acids, aliphatic or cyclic ethers, and ketones. The preferred electron donors comprise methyl formiate, methyl paratoluate, ethyl or butyl acetate, ethyl ether, tetrahydrofurane dioxane, acetone, and methyl isobutyl ketone.

The titanium, Mg and electron donor compounds may be distributed on a porous support of the type silica gel and silica/alumina for example.

In this case it concerns gels having a large surface ($300m^2/g$) and a large porous volume, for example of the order of 1.7 $cm^3/g$. A silica 952 of the firm GRACE satisfies this type of specification.

The co-catalysts are of the type $Al(R)_aX_bH_c$ with X=Cl or OR; R is a saturated alkyl radical of $C_1$ to $C_{14}$ with a +b +c =3. Such activators comprise for example $Al(C_2H_5)_3$, $Al(C_2H_5)_2$ Cl, Al (i-$C_4H_9$)$_3$, $Al_2(C_2H_5)_3Cl_3$, Al( i$C_4H_9$)$H_2$, $Al(C_6H_{13})_3$, $Al(C_8H_{17})_3$, $Al(C_2H_5)H_2$ and $Al(C_2H_5)_2$(O $C_2H_5$).

In the catalysts of the Ziegler type, the titanium may be replaced by other transition metals such as zirconium or vanadium.

With catalysts of the supported chromium type, use is made of the chromium spread over a metal oxide porous support; if desired, other compounds may be spread over the porous support such as titanium coumpounds. A fluorination of the catalyst may also be effected.

Before being used in the polymerization, these catalysts are subjected to a heat treatment at high temperature in an oxidizing and anhydrous atmosphere.

Among the chromium compounds which may be used there may be mentioned chromium acetylacetonate, organic chromates, chromium acetates and chromium oxide ($CrO_3$).

Among the suitable supports, there may be mentioned the silica gels or alumina silica gels (for example silica GRACE 952). The other titanium compounds may be alkyl titanates or chlorotitanates. The fluorination can be carried out by thermal decomposition of salts giving off hydrofluoric acid. Salts such as $(NH_4)_2SiF_6$ or $(NH_4)_2 TiF_6$ are good fluorination agents.

The heat treatment may be carried out under dry air at temperatures of the order of 600° to 800° C.

The activated catalysts obtained may if desired be employed in the presence of co-catalysts of the same type as those employed in Ziegler catalysis.

The two catalytic systems described may be advantageously employed for the polymerization of the ethylene or the copolymerization of the ethylene with α-olefins.

The Ziegler catalysts are also employed in the polymerization of the propylene and 1-butene to obtain products having a high isotacticity index.

As is usual in the polymerization reactions of olefins, they must be carried out away from air and humidity and consequently the polymerization zone has all traces of humidity advantageously removed therefrom by flushing with a gas such as hydrogen, nitrogen or argon or by contacting one of the components of the catalyst which is capable of cleaning the polymerization zone, which is the case for example of the alkylaluminum compounds, co-catalysts in the Ziegler catalysis.

The invention combines the spherical shape of the polymerization zone and the nature of the agitating means which gives particularly advantageous and surprising results in the polymerization reactions.

The agitating means contained in the spherical polymerization zone comprise mainly a turbine unit having shaped blades. The blades of the turbine are substantially very close to the spherical wall defining the polymerization zone. In practice, it has been found that clearances of 1 to 50 mm were suitable. The turbine blades cooperate with the spherical wall on about 10 to 60% of its surface. It has been found that blades which would extend over an excessively small zone, less than about 10% of the spherical surface of the polymerization zone, would not produce a sufficiently uniform and homogeneous agitation to obtain the results of the invention. On the other hand, it is unnecessary, and even disadvantageous, that the blades extend beyond a limit representing about 60% of the spherical surface. For a practical construction, the turbine has blades of such length that the diameter of the circle described by their ends is at least equal to one third of the diameter of the sphere. The blades may pass alongside the spherical wall until they reach an equatorial plane in which case the diameter the circle generated by their ends is equal to at least the diameter of the sphere minus the clearance. These blades may even extend slightly beyond the equatorial plane normal to the axis of rotation.

Advantageously, the turbine unit comprises two to eight blades an preferably three blades symmetrically arranged around the agitation axis and having such profiles as to ensure an thorough mixing.

In addition, but without this being essential, the agitating means may comprise, in the part of the spherical polymerization zone unoccupied by the turbine unit, an additional scraper system comprising one or more elements driven in rotation. These elements are preferably filiform blades having such profiles as to avoid disturbing the travelling of the gases.

Optionally, the agitating means may further comprise one or more turbines termed dilacerating turbines, the function of which, if required, is to reduce the size of the agglomerates liable to be formed during the polymerization. These dilacerating turbines are located in the zone above the circle generated by the end of the blades of the main agitator turbine.

Owing to the spherical shape of the polymerization zone, the mixing of the gases and powders inside the zone is considerable. It is thought that this is due to the fact that the centrifugal force decreases as the polymer powder rises above the equatorial plane of the reactor. In the course of this rise of the powder the effect of gravity prevails beyond a certain height and the grains fall toward the centre of the sphere. This mixing is achieved without need to employ counterblades which create dead or badly stirred zones. The grains are well-dispersed irrespective of their diameter. The additional scraper system, which has such profile as to avoid disturbing the passage of the gases, permits the avoidance of any possible electrostatic or other agglomeration of the polymer powder being formed.

The combination of the spherical shape of the polymerization zone and the manner of agitating also permits the obtainment of excellent coefficients of transfer with the wall and intimate contact between the fluids introduced in the reactor and the growing polymer powder while maintaining a good fluidization of the powders without formation of any unagitated zone. Owing to this combination of the spherical shape and the agitating means, there is obtained a perfect dispersion of the catalyst, of the growing polymer powder and of the gaseous reaction mixture. Thus the polymerization is carried out always under good conditions, irrespective of the charge and the grain size of the polymer present in the polymerization zone, it being possible that this charge be zero or almost zero when starting up.

Further, the grain size of the catalysts and the polymer powders becomes unimportant. Thus it is possible to employ according to the invention a much wider range of solid catalysts.

According to the invention, the polymerization temperature is also controlled. The means employed for this purpose are not critical and may be of a very varied type. According to one embodiment, they may comprise a jacket with inlets and outlets for the circulation of the controlling fluid. In the case of the invention, the jacket conforms to the shape of the wall defining the polymerization zone and therefore has a generally spherical shape. It is provided with respective pipes for the circulation of the controlling fluid.

In this first manner of controlling the temperature, the temperature is controlled from the exterior. According to other controlling modes, which may be found to be preferable, the temperature is controlled inside the very polymerization zone, which is particularly advantageous in the present case owing to the spherical shape. For this purpose there may be injected into the polymerization zone a cooled gas, a compressed fluid which cools by expansion, or a liquid which vaporizes under the conditions prevailing within the polymerization zone.

According to another aspect, the invention also concerns a gaseous phase polymerization reactor employing heterogeneous catalysis which comprises mainly means for introducing the monomer or monomers to be polymerized and the catalytic system, means for agitating the catalyst in solid particles and the polymer being formed, means for controlling the temperature and means for withdrawing the polymer obtained, said reactor being of an essentially spherical shape and the agitating means comprising mainly a turbine unit having shaped blades driven in rotation, said blades passing alongside the inner wall of the reactor on 10 to 60% of its surface.

As concerns the features of the agitating means for the reactor according to the invention reference will be made to what has already been indicated. The turbine unit is placed in the lower part of the reactor. The pivot of this unit is disposed in the region of the wall of the reactor at a point located in the lower part of the latter, but not necessarily at the lowest point of the sphere. The driving means for the turbine unit comprise a shaft which extends through the wall of the reactor in a sealed manner. The shaft may be vertical or have any other oblique position relative to the vertical, depending on the position of the pivot of the turbine unit. The shaft may be short, in particular in the case where the driving means are located in the immediate vicinity of the wall of the reactor, in which case the shaft merely extends through the wall and connects the driving means to the pivot of the turbine unit. In other cases, the shaft may extend through the reactor, for example if the driving means are located in the upper part of the reactor. In such cases, the shaft may be vertical, but this position is not critical.

If the additional scraper system is included, it is disposed in the upper part of the spherical reactor. It may be actuated by driving means relating thereto or by the same means as those employed for driving the turbine unit, which constitutes the main agitation means in the reactor according to the invention. If one or more dilacerating turbines are present, they are located in the part above the circle generated by the end of the poles of the main turbine.

As concerns the means controlling the temperature, reference will be made also to the foregoing description of the process according to the invention.

The reactor according to the invention also comprises means for drawing off the polymer obtained, for example at least one valve with a discharge pipe connected in the lower part of the spherical reactor.

The reactor should also be capable of being put in communication with the atmosphere. For this purpose, a pipe may be connected to the upper dome of the reactor.

Means are also provided for introducing renewed quantities of catalysts and possibly chain limitors such as hydrogen, in particular for continuous operation.

The reactor according to the invention lends itself perfectly well to a continuous operation. The polymer powder is taken off in the lower part of the reactor and a supply of the monomer(s) is introduced which corresponds to their consumption in the course of the polymerization reaction; the gaseous monomer is thus absorbed as the reaction proceeds. A device for introducing the catalysts enables the exothermic type of reaction to be maintained.

Note also that for certain needs, the reactor may be provided with a lock device for taking off samples of products in the course of the reaction. This lock may be employed in the form of a pipe provided with valves connected to any part of the reactor and capable of being flushed by an inert atmosphere.

An advantageous embodiment of a reactor of small size according to the invention comprises two semi-spheres assembled in their equatorial plane. The two semi-spheres are assembled by clamping means, for example cramps arranged around the periphery of the reactor in the equatorial plane of assembly. The semi-spheres may thus be easily disassembled in order to have access to the interior of the reactor.

The form of the industrial reactors according to the invention is not necessarily that of a complete integral sphere. According to the invention, the sole important characteristic is that the polymerization zone be defined by a spherical wall. But, however, various pipes, connections or openings may interrupt or modify the spherical shape of the reactor. Thus, for convenience of use and in particular cleaning, the reactor may comprise openings of sufficient size to permit access to the interior and, for example, allow the entry of a man in the case of large reactors.

In practice, the reactor of the invention is an integral part of a more complete plant comprising monomer supply circuits, inert gas and chain regulating gas supply circuits. In the case of gaseous monomers, these circuits comprise means for putting under pressure the monomer gas and establishing a constant introduction pressure, such as defined for example by a pressure regulator. The circuit also advantageously contains a flow-meter delivering the instantaneous flow value of the gas introduced. If it concerns liquid monomers which must be vaporized under the operating conditions within the reactor, they may be injected by means of a diaphragm pump or any other equivalent device. The injection circuit also comprises a flow-meter giving a direct reading of the instantaneous flow of the liquid supplied.

If it is desired to introduce monomers together so as to affect a copolymerization, the flow of each circuit may be controlled so as to obtain a precise and constant relative ratio between the monomers.

A gas-analyzer may generally be employed for at each instant controlling the flows in accordance with the desired reaction conditions.

Of course, also, the plant comprises boxes for controlling the temperatures and the flows and recorders for the various parameters of the reaction, such as:
temperature of the reactor,
temperature of the heat-carrying fluids in the different points of the plant,
agitation speed,
torque acting on the agitator,
reaction pressure,
flow of the monomer(s).

The evolution of the polymerization reactions may thus be followed in a precise manner.

The invention may be used to advantage for the prepolymerization of olefins, for example ethylene, propylene, 1-butene, and other olefins mentioned before.

The prepolymer may be prepared directly within the spherical polymerization zone so as to control the particle size of the catalyst and reduce its activity at the start of the reaction, after which the polymerization is continued in the same reactor under well-controlled conditions. But, preferably, the reactor of the invention is employed as an annex prepolymerization reactor, the prepolymer being then introduced in another polymerization reactor in a gaseous phase. Within the prepolymerization reactor, the catalyst grains grow and become less sensitive to the environment of the polymerization zone. The prepolymer having a catalytic activity is thereafter transferred into another reactor of any type having a fluid or agitated bed, or a spherical reactor according to the invention. The invention is perfectly suitable for producing such a prepolymer and the results obtained are as advantageous as they are surprising.

The invention will now be further illustrated, without being in any way limited, by the ensuing description with reference to the accompanying drawings in which:

FIGS. 1a to 1f are diagrams illustrating examples of polymerization zones applying the process of the invention.

Figure 1A:
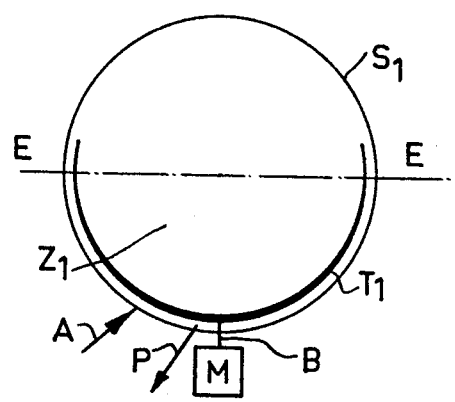
FIGS. 1a to 1f are diagrams illustrating modes of carrying out the process according to the invention.

FIG. 1a shows a closed polymerization zone $Z_1$ defined by a spherical wall $S_1$. A turbine unit $T_1$ having symmetrical blades is rotatably mounted by a pivot B located substantially at the lower point of the sphere. A motor M drives the turbine $T_1$. The supply of the monomer(s) is diagrammatically represented by the arrow A. The polymer obtained is taken off as shown at P. In this example, the ends of the blades of the turbine unit $T_1$ extend beyond the equatorial plane E—E normal to the axis of rotation (which is substantially vertical in the case of FIG. 1a) and cooperate with the inner spherical wall up to 60% of its surface.

Figure 1B:
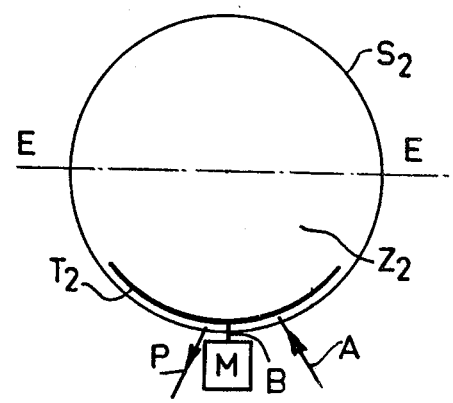

FIG. 1b shows a closed polymerization zone $Z_2$ defined by a spherical wall $S_2$. A turbine unit $T_2$ mounted to rotate about a pivot B is driven by a motor M in the same way as in FIG. 1a. The supply of monomer(s) is represented at A and the output of polymer is diagrammatically represented at P. In the case of FIG. 1b, the ends of the blades of the turbine unit $T_2$ describe a circle whose diameter is equal to at least one third of the diameter of the sphere $S_2$.

Figure 1C:
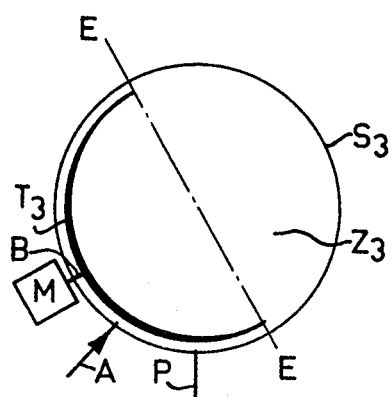

FIG. 1c is a diagram similar to FIGS. 1a and 1b showing a polymerization zone $Z_3$ defined by a sphere $S_3$. The turbine $T_3$ driven by the motor $M_3$ rotates about a pivot B which is offset with respect to the lower point of the sphere. The monomer or monomers are introduced at A and the polymer obtained is taken off at P. In this case, the axis of rotation of the turbine $T_3$ is not vertical. The equatorial plane (line E—E) perpendicular to this axis of rotation is oblique. The ends of the blades of the turbine $T_3$ describe a circle whose diameter is substantially equal to that of the sphere $S_3$.

Figure 1D:
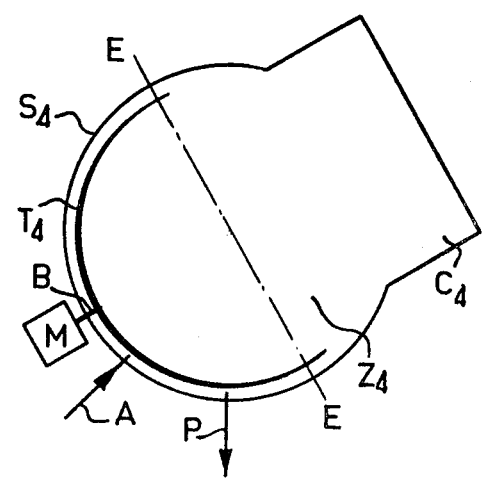

FIG. 1d illustrates a mainly spherical polymerization zone $Z_4$ defined by a spherical wall $S_4$ and by a cylindrical extension $C_4$ which may act as a lock or permit access to the zone $Z_4$. The mounting of the turbine $T_4$ driven by the motor M about a pivot B, is the same as in FIG. 1c. The monomer or monomers are introduced at A and the polymer obtained is taken off at P.

Figures 1E, 1F:
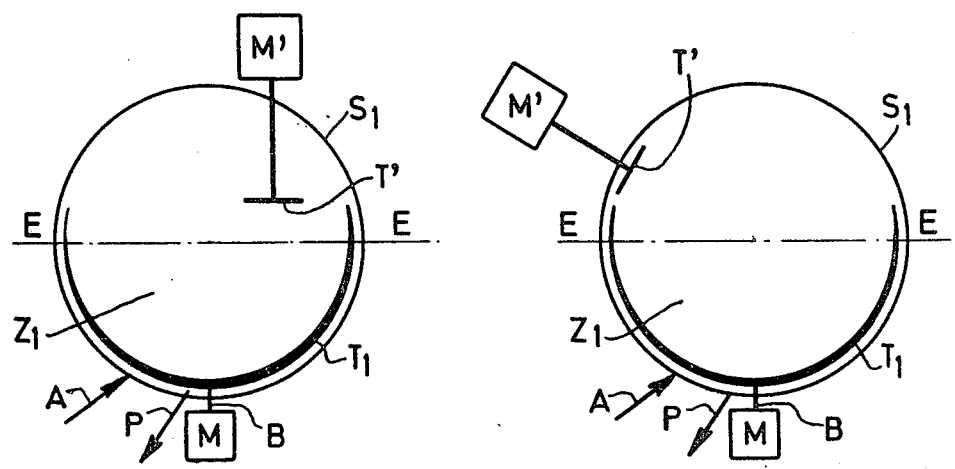

FIGS. 1e and 1f represent modifications corresponding to FIG. 1a in which are provided turbines T′ driven by a motor M′. These turbines, termed "dilacerating turbines" have for function to reduce the size of the possible agglomerates which form during the polymerization. These turbines T′ are disposed in the zone of the reactor located above the circle generated by the main turbine $T_1$ if FIGS. 1e and 1f are referred to.

In FIGS. 1a to 1f the temperature control means have not been shown and may for example comprise a jacket in which a control fluid circulates.

Figure 2:
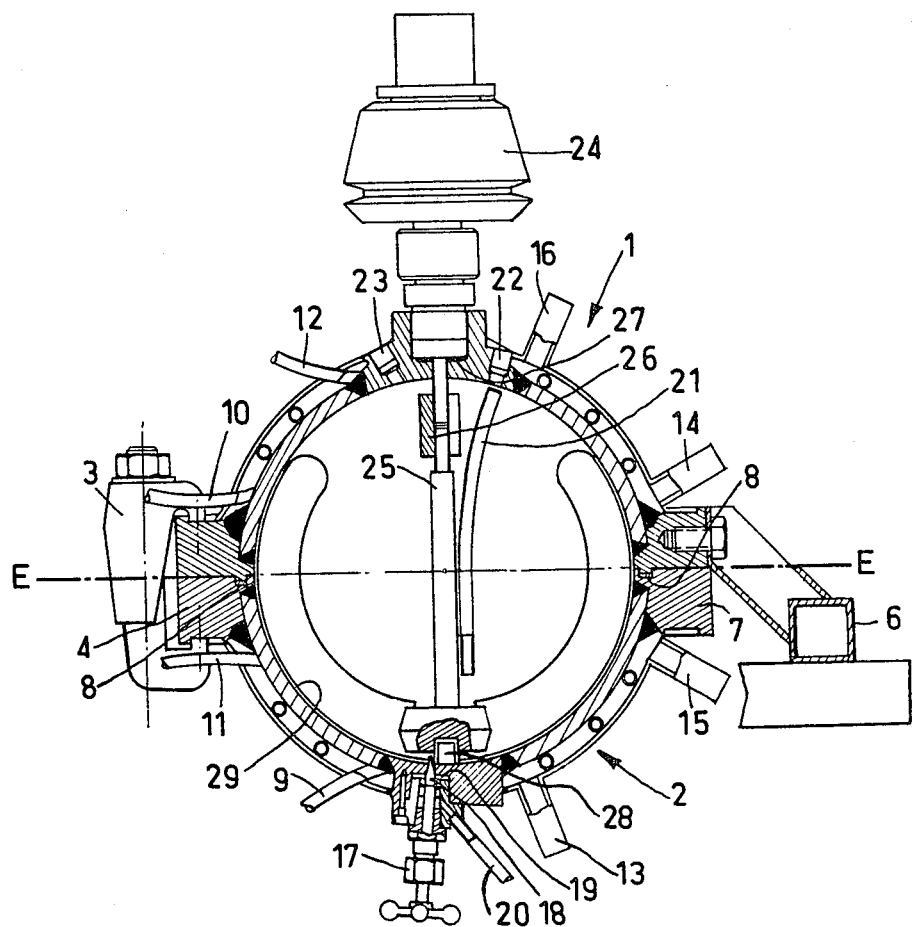
FIG. 2 is an axial sectional view of a reactor of small size according to the invention.
Figure 3:
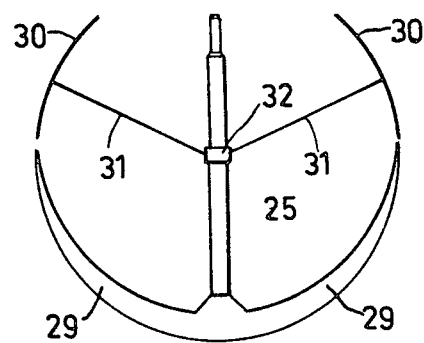
FIG. 3 is a diagrammatic front elevational view of the agitation means of the reactor of FIG. 2.
Figure 4:
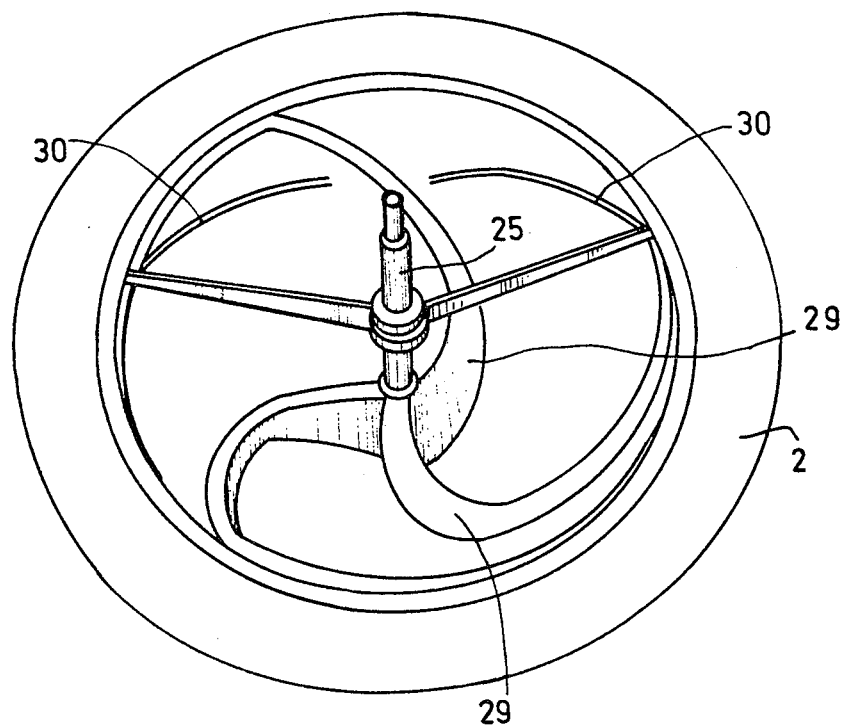
FIG. 4 is a perspective top view of the lower half of the reactor of FIG. 2 also showing the agitation system.

FIGS. 2 to 4 show a reactor according to the invention suitable for operations on a pilot scale and having the following characteristics:

inside diameter: 250 mm
volume: 8.2 l
test pressure: 75 bars
service pressure: 50 bars.

The spherical reactor shown in FIG. 2 comprises two semi-spheres, an upper semi-sphere 1 and a lower semi-sphere 2. These elements are machined from stainless steel and their inner surface is polished. The semi-spheres 1 and 2 are assembled and held together by cramps 3 arranged around the periphery 4 of the reactor in a diametrical plane.

Shown at 6 is a support whereby it is possible to hold the reactor in the position shown in FIG. 2. This support 6 cooperates with an element 7 which is welded to the wall of the reactor. A "Teflon" gasket 8 provides a seal between the two semi-spheres.

In order to control the temperature, the reactor is surrounded by a jacket. Within this jacket are heat exchange circuits, namely an oil circuit for heating and controlling the temperature and a water circuit circulating inside a coiled tube immersed in the oil circuit and providing an efficient cooling in the event of a rapid heating up of the reaction.

Shown at 9, 10 are the inlet pipes of the coiled tube conveying the cooling water and shown at 11, 12 are the outlet pipes of the coiled water tube.

Shown at 13 and 14 are the inlet pipes of the temperature controlling oil circuit and at 15 and 16 the pipes for the outlet of the oil control fluid. The control means also comprise an oil circulating pump and two external exchangers placed in the oil circuit and not shown in the drawings. Such a system is normally sufficient for a good control of the temperature. The water circuit in the coiled tube immersed in the oil circuit is only found of use in the case of a highly exothermic reaction.

In its lower part, the reactor is provided with a valve 17 mounted in a conventional manner as illustrated in the drawing. The valve body is mounted in a support 18 with interposition of a PTFE gasket 19. A pipe 20 serves to take off the polymer powder obtained. In the upper semi-sphere 1, orifices such as 22, 23 are provided for introducing the monomers, taking temperatures and pressure, etc.

These connections are provided with a sintered metal disk (not shown) so as to avoid a possible plugging up. The pipe 21 is a glove finger thermocouple and opens onto the lower semi-sphere 2.

Also shown diagrammatically in the upper semi-sphere 1 is a connection 23 for putting the interior of the reactor in communication with the atmosphere. This conjection 23 is also provided with a sintered metal disk (not shown).

One of the original features of the reactor of the invention resides in the structure of the agitator means. These are seen in FIGS. 2 to 4. A unit 24 which, in the chosen embodiment is driven magnetically, drives a shaft 25 which is disposed vertically along a diameter of the spherical reactor, with interposition of a coupling sleeve 26. The shaft passage is sealed by a "Teflon" seal 27. Such a magnetic agitator drive ensures an excellent seal together with high agitation torque. A commercially available unit which has given good results for the invention is the magnet-drive system of the firm Burton-Corblin. It will be understood that any other driving means may be employed. The magnetic drive has a further advantage in that it does not interfere with the contents of the reactor. The agitator means proper comprise a turbine unit carried by a pivot 28 mounted at the lower point of the lower semi-sphere 2. In the chosen embodiment, this movable unit oomprises three blades 29. These agitating means, of the scraper turbine type, are mounted in such manner, that the blades 29 pass alongside the bottom of the lower semi-sphere 2, as can be seen in FIG. 2. In this embodiment, the distance between the blades 29 and the wall of the reactor at the level of the equatorial plane E—E is of the order of 4 to 5 mm. It can also be seen that the blades 29 extend substantially up to one-half of the reactor when the latter has been assembled.

The agitating means may comprise in addition in the volume of this upper semi-sphere 1, an agitator of the scraper type comprising two filiform blades. In order to render the drawing more clear, this agitator has not been shown in FIG. 2 but is clearly seen in FIGS. 3 and 4. It can be seen that the blades 13 are each carried by an arm 31 and that the arms extend symmetrically relative to the shaft 25 and are fixed at a common point 32 of the latter.

Other agitating means may additionally employ one or more dilacerating turbines.

The axis of these turbines may be directed toward the centre of the sphere or the axis may extend downwardly from the top of the reactor as shown in FIGS. 1e and 1f.

FIG. 4 shows the interior of the reactor and the position of the turbine unit with its blades 29 in the lower semi-sphere 2. The additional scraper unit with the filiform blades 30 is also shown.

The turbine unit mounted in the lower semi-sphere 2 may be of the type sold by the firm MORITZ S.A. so-called force turbine. The present invention benefits from the existence of these turbines and applies them to the field of polymerization in a spherical reactor under pressure so as to obtain results which were heretofore impossible with this type of reaction.

The following examples illustrate the application of the process of the invention to prepolymerization, to polymerization and to copolymerization of olefins. The examples which illustrate the homopolymerization of ethylene, the copolymerization of ethylene/α-olefin and the polymerization of propylene are in no way intended to limit the scope of the invention, since the invention is applicable to the polymerization or to the interpolymerization of other olefins in a gaseous phase.

There has moreover been mentioned for comparative purposes an example in which was employed a reactor of cylindrical shape already available in the prior art and provided with an anchor agitator system.

In the examples carried out according to the invention, there was used the reactor described with reference to FIGS. 2 to 4 having an inside diameter of 250 mm and a volume of 8.2 l. Four examples concerns polymerization reactions in discontinuous operation with various monomers and catalysts, and two examples relate to continuous polymerizations.

EXAMPLES

EXAMPLE 1

Discontinuous polymerization of propylene (supported Ziegler catalysis)

Thirty grams of a powdered precharge of polypropylene are introduced in a 8.2 l spherical reactor. After drying, the reactor is flushed with gaseous propylene.

The catalyst employed is of the supported Ziegler type comprising a halogenated titanium compound deposited on $MgCl_2$ and a complexing agent of the aromatic ester type. This catalyst is in the form of a dry powder having a mean particle diameter equal to 60 microns.

This catalyst is used in the presence of a compound selected among electron donors (in the present case methyl paratoluate or MPT) and a co-catalyst or activator selected from the alkyl-aluminum family (in the present example triethyl aluminum or TEA).

The catalytic charge comprises in the order of introduction 35 millimoles of triethyl aluminum, 6.9 millimoles of methyl paratoluate and 300 mg of the supported Ziegler catalyst containing 1.8% O of Ti. The molar ratios Al/Ti and TEA/MPT are respectively 310 and 5. Propylene is then introduced until 7 bars of absolute pressure are reached and the reaction is carried out at 70° C. for 4 hrs. 50 mn. The speed of agitation is 400 rpm. The reaction pressure is maintained constant by the addition of fresh propylene.

At the end of the reaction, 690 g of polypropylene in the form of a homogeneous powder are collected. The mean particle size of the powder obtained is 500 microns.

The following Table I summarizes the reaction parameters and the properties of the polymer obtained.

EXAMPLE 2

Discoutinuous ethylene/propylene copolymerization 30 g of a powdered precharge of low density linear polyethylene are introduced in the spherical reactor. After drying, the reactor is flushed with nitrogen.

The catalyst employed is of the supported Ziegler type comprising a halogenated titanium compound supported on $MgCl_2$ and a complexing agent of the aromatic ester type. This catalyst is in the form of a dry powder having a mean particle size of 60 microns. This catalyst is employed in the presence of a co-catalyst or activator selected from the alkyl aluminum family (triethyl aluminum in the considered example). The catalytic charge of the reactor comprises by order of introduction 146 mg of the supported Ziegler catalyst, 12 mMoles of triethyl aluminum in solution in 15 cc of heptane. Traces of solvent are eliminated by maintaining the reactor under vacuum at 75° C. for 10 minutes. The mass ratios Al/Ti and Ti/Mg are respectively 126 and 0.125.

The reactor is then charged with 2 bars of propylene, 3 bars of hydrogen, and 6 bars of ethylene. The polymerization is carried out at 75° C. under 11 bars of absolute pressure. The agitation speed is 400 rpm. The pressure is maintained constant by the introduction of a gaseous propylene/ethylene mixture with a 0.06 propylene/ethylene molar ratio.

After 4 hours, 1310 g of low density linear polyethylene are collected in the form of a homogeneous powder having a mean particle size of 250 microns.

The reaction parameters and the properties of the products are summarized in the following Table I.

EXAMPLE 3

Discontinuous homopolymerization of ethylene 30 g of a powdered precharge of high density polyethylene are introduced in the spherical reactor. After drying, the reactor is flushed with nitrogen.

The catalyst employed for the polymerization is of the supported Ziegler type comprising a halogenated titanium compound deposited on $MgCl_2$ and a complexing agent of the aromatic ester type. This catalyst is in the form of a dry powder having a mean particle size of 60 microns.

This catalyst is employed in the presence of a cocatalyst selected from the alkyl aluminum family (triethyl aluminum in the present example).

The catalytic charge comprises in the order of introduction: 146 mg of the supported Ziegler catalyst containing 1.8% of Ti then 12 millimoles of triethyl aluminum in solution in 15 cc of heptane. The mass ratio Al/Ti is 126. Traces of solvent are eliminated by keeping the reactor under vacuum at a temperature of 75° C. for 10 minutes.

The reactor is then charged with 3 bars of hydrogen and 8 bars of ethylene. The polymerization is carried out at 75° C. under an absolute pressure of 11 bars with an agitation speed of 400 rpm. The pressure is maintained constant by introduction of fresh ethylene. After 5 hours, 1477 g of a homogeneous powder of high density polyethylene are collected. The reaction parameters and the properties of the polymer are summarized in the following Table I.

EXAMPLE 4

Discontinuous ethylene/1-butene copolymerization

After drying, the reactor is flushed with nitrogen.

The catalyst employed is of the supported chromium oxide on a silion gel type modified with isopropyl titanate and ammomium hexafluorosilicate (see U.S. Pat. No. 4,011,382). Before its use in polymerization, this catalyst is activated in dry air at 650° C. and then flushed at 150° C. with nitrogen. The composition of the catalyst expressed as a percentage of the silica gel is 1% of chromium, 0.3% of F and 4.7% of titanium. This catalyst is in the form of a dry powder having a mean particle size of 70 microns. The catalytic charge comprises 0.254 g of roasted catalyst degassed with nitrogen.

1.6 bars of 1-butene and 18.4 bars of ethylene are then introduced. The temperature of the reaction is maintained at 90° C. The pressure is maintained constant at 20 relative bars by introduction of a gaseous 1-butene/ethylene mixture in a 1-butene/ethylene molar ratio of 0.04.

After 220 minutes, 1270 g of low-density linear polyethylene are collected in the form of a homogeneous powder having a mean particle size of 700 microns.

EXAMPLE 5

Continuous ethylene/1-butene copolymerization

After drying, the reactor is flushed with ethylene. The catalyst employed is of the type comprising chromium oxide supported on a silica gel. Before being employed in the polymerization, this catalyst is activated in dry air at 650° C. and then flushed at 150° C. with nitrogen.

The composition of the catalyst, expressed as a percentage relative to the silica gel, is 1% of chromium. This catalyst is in the form of a dry powder having a mean particle size of 70 microns.

An injector permits the introduction of 10 mg of catalyst at a time by means of a lock. The vector gas employed is nitrogen.

After the ethylene and 1-butene have been put under pressure, the respective concentrations are maintained by a 1-butene pump and a dry compressor for the ethylene controlled by a gas analyzer. The 1-butene/ethylene molar ratio is maintained at 0.04 during the test. The accumulation of nitrogen is avoided by a periodic flushing of the gaseous phase. The starting up of the reaction was carried out with an injection rate of 10 mg every 30 seconds until 1500 mg of catalyst have been introduced in the reactor at the end of 75 minutes. The rate of injection of the catalyst in then gradually reduced until an injection rate of 10 mg every 6 minutes is reached and the withdrawal of the polymer is started with an extracting system consisting of two synchronized valves.

Stationary operation

Throughout the reaction, the total pressure is 20 absolute bars, the temperature 90° C. and the agitation speed 400 rpm. The test lasted nine hours.

In stationary operation, the production rate of the reactor was adjusted by an injection rate of the catalyst of 10 mg of catalyst every six minutes and the polymer was withdrawn by means of the extracting system at the rate of on average 360 g per hour. The polymer obtained is a low density linear polyethylene corresponding to a mean production of 3600 g of PE per gram of solid catalyst and is in the form of a homogeneous powder having a mean particle size of 550 microns. (The rate of withdrawal was adjusted by controlling the variation of the torque of the agitator turbine). The following Table II summarizes the reaction parameters and the properties of the polymer obtained.

EXAMPLE 6

Continuous ethylene/1-butene copolymerization

After drying, the reactor is flushed with ethylene. The catalyst employed is a supported Ziegler type catalyst comprising a halogenated compound of titanium supported on $MgCl_2$ and a complexing agent of the aromatic ester type.

This catalyst is in the form of a dry powder having a particle diameter of 60 microns. This catalyst is injected by means of a lock provided with synchronized valves. The vector gas employed for the injection of the catalyst is nitrogen.

This catalyst is employed in the presence of a cocatalyst or activator selected from the alkyl aluminum family (triethyl aluminum in the considered example).

The injection system adapted for this catalyst permits the introduction of about 10 mg of supported Ziegler catalyst powder per injection pulsion.

Starting up the reactor

After having put the ethylene, the 1-butene and the hydrogen under pressure, the respective concentrations are maintained constant by a pump for the 1-butene, a compressor for the ethylene and by expansion from a gas cylinder for the hydrogen controlled by a gas analyzer.

The molar percentages of the gases are adjusted respectively to about 18% for the 1-butene, 24.5% for the hydrogen, and 54.5% for the ethylene, the proportion of nitrogen is maintained lower than 5% molar by periodic flushing.

The reaction is started up with an injection rate of 10 mg of Ziegler catalyst every minute. Simultaneously the triethyl aluminum is introduced with a micro-metering pump (syringe type) in the reactor while constantly maintaining a molar ratio Al/Ti of the order of 240. After 90 minutes, the withdrawal of the polymer is started with an extracting system consisting of two valves and the rate of injection of the catalyst is reduced to 10 mg of Ziegler catalyst every 2 minutes.

Stationary operation

In stationary operation, the production rate is adjusted by rate of injection of the Ziegler catalyst and of the co-catalyst, namely 10 mg of Ziegler catalyst every 2 minutes and 3.69 cc of pure triethyl aluminum per hour.

Throughout the reaction, the total pressure is 11 absolute bars, the temperature 75° C. and the agitation speed 400 rpm.

The polymer is withdrawn at the rate of 870 grams of polymer per hour on average. The polymer obtained is a low density linear polyethylene corresponding to a yield of 2900 g of polymer per gram of supported Ziegler catalyst. The copolymer is in the form of a homogeneous polymer having a mean particle size of 600 microns. The test was carried out for a period of 16 hours.

EXAMPLE 7

Synthesis of a prepolymer and use of the prepolymer for obtaining discontinuously an ethylene/1-butene copolymer (a) Discontinuous ethylene/1-butene prepolymerization.

300 g of a powdered precharge of linear low-density polyethylene are introduced in the spherical reactor. After drying, the reactor is flushed with nitrogen; as in the Example 2, the catalyst is of the supported Ziegler type comprising a halogenated compound of titanium supported on MgCl$_2$ and a complexing agent of the aromatic ester type. The catalytic charge of the reactor is 7 g of this supported catalyst and thereafter 95 cc of a 180 g/liter solution of triethyl aluminum in heptane are added. After eliminating the solvent and locking the reactor, 19 absolute bars of nitrogen are introduced and the temperature of the reactor is brought to 90° C. Thereafter, the reactor is fed with a constant flow of 387 g of ethylene per hour and a constant flow of 30 g of 1-butene per hour. The reaction is stopped at the end of 210 minutes. 1460 g of prepolymer are obtained (not including the initial charge).

(b) Synthesis of an ethylene/1-butene copolymer with the aid of a prepolymer

At the end of the prepolymerization reaction, 65 g of prepolymer thus prepared are withdrawn by means of a cyclone adapted to the base valve of the reactor. Thereafter, the polymerization reaction is carried out with the following procedure: the reactor is emptied of its contents and dried in the usual manner, the cyclone containing the prepolymer is connected to the upper part of the reactor, the prepolymer is sent into the reactor. When this operation is finished, 2.25 g of triethyl aluminum in solution in heptane are injected. After evaporation of the solvent, the temperature of the reactor is brought to 90° C. and the agitation speed is adjusted to 350 rpm. Thereafter, there are introduced in the following order two bars of butene, four bars of nitrogen, three bars of hydrogen, and twelve bars of ethylene. The reactor is fed with an ethylene/1-butene mixture containing 4% molar of 1-butene. After four hours of reaction at constant pressure, 2500 g of low-density linear polyethylene in the form of a homogeneous powder having a mean particle size of 420 microns are collected. Throughout the reaction, the exothermicity was perfectly controlled.

The yield of polymer is of the order of 9450 g of polyethylene per gram of Ziegler catalyst.

EXAMPLE 8 (comparison)

Discontinuous homopolymerization of ethylene in a reactor of cylindrical shape with an agitator of anchor type For this test there is employed a cylindrical reactor having a volume of 2.2 l. The agitator employed is of the anchor type. After drying, the reactor is flushed with ethylene. The catalyst employed is of the chromium oxide type supported on a silica gel. Before being employed in the polymerization, the catalyst is activated in dry air at 650° C. and then flushed at 150° C. with nitrogen. The composition of the catalyst, expressed as a percentage relative to the silica gel is 1% of chromium. This catalyst is in the form of a dry powder having a mean particle size of 70 microns. The catalytic charge is 0.350 g of catalyst roasted and degassed with nitrogen.

Twenty bars of ethylene are then introduced. The reaction is carried out at 90° C. and the pressure is maintained constant by the introduction of fresh ethylene. After three hours thirty minutes, 296 g of high-density polyethylene are collected in the form of a 82 g of non-homogeneous powder and 214 g of polymer blocks formed by agglomerated powders. The yield of the divided powder is 997 g of polymer per gram of catalyst.

Thus it is found that the polymerization reaction yields a polymer of non-uniform characteristics resulting from the fact that the conditions of the contacting of the ethylene and agitated catalyst are not satisfactory in the cylindrical reactor.

The same test was carried out again with different types of moving components (aircraft propeller type of blade, dissymmetrical agitator etc.) at different speeds. There is formed after polymerization a powder which is but little homogeneous with a high proportion of agglomerates and deposits in the corners of the reactor.

TABLE I

DISCONTINUOUS POLYMERIZATIONS ACCORDING TO THE INVENTION
TEA: Triethyl aluminum; MPT: Methyl paratoluate; MI$_2$: melting index at 190° C., AVM: Apparent volumic mass

|  | Homopolymerization of ethylene Ex. 3 | Ethylene/1-butene copolymerization Ex. 4 | Ethylene/propylene Copolymerization Ex. 2 | Homopolymerization of propylene Ex. 1 | 1-butene/ethylene copolymerization Ex. 7 |
|---|---|---|---|---|---|
| Type of catalyst | Supported Ziegler | SiO$_2$/CrO$_3$/TiO$_2$/F | Supported Ziegler | Supported Ziegler | Prepolymer obtained with Ziegler catalyst |
| Co-catalyst | TEA |  | TEA | TEA | TEA |
| Complexing agent |  |  |  | MPT |  |
| Mean dia. of catalyst particles | 60 microns | 70 microns | 60 microns | 60 microns | 550 microns |
| Mean dia. of polymer particles | 400 microns | 700 microns | 400 microns | 500 microns | 650 microns |
| Weight of polymer obtained after deduction of initial charge | 1447 g | 1270 g | 1280 g | 660 g | 2500 g |
| Yield of polymer in g/g of catalyst | 9910 | 5000 | 8767 | 2100 | 9450 |
| MI$_2$ | 0.5 | 1.1 | 3.1 | 10+ | 4.8 |
| Density | 0.96 | 0.919 | 0.923 | 87.2 | 0.920 |
| Index of isotacticity | 0.34 | 0.49 | 0.35 | 0.44 | 0.48 |
| AVM of polymer |  |  |  |  |  |

+Melting index for polypropylene effected with a weight of 2.160 kg at 230° C.

TABLE II

CONTINUOUS POLYMERIZATIONS ACCORDING TO THE INVENTION
TEA: triethyl aluminum; MPT: Methyl paratoluate; MI$_2$ : melting index at 190° C., AVM: apparent volumic mass

|  | Ethylene-1-butene copolymer | |
|---|---|---|
|  | Ex. 6 Ziegler catalysis | Ex. 5 Catalysis with chromium |
| Type of catalyst | Supported Ziegler | SiO$_2$/CrO$_3$ |
| Co-catalyst | TEA |  |
| Complexing agent |  |  |
| Mean dia. of catalyst particles | 60 microns | 70 microns |
| Mean dia. of polymer particles | 600 microns | 550 microns |
| Weight of polymer obtained | 870 g/hour | 36 g/hour |
| Yield of polymer in g/g of catalyst | 2900 | 3600 |
| MI$_2$ | 0.7 | 0.12 |
| Density | 0.927 | 0.922 |
| AVM | 0.37 | 0.48 |

We claim:

1. Process for polymerization in a gaseous phase using heterogeneous catalysis by putting at least one monomer, gaseous under the conditions of the reaction in contact with a solid catalyst, in an agitated polymerization zone, said process comprising employing a polymerization zone defined by a spherical wall, and effecting the agitation by means of a turbine unit having blades and driven in rotation, said blades extending along said wall in 10 to 60% of its surface, the catalyst particles and the growing polymer powder being driven by centrifugal force in at least a part of the spherical wall and falling back in the central part of the spherical zone whereby an thorough and uniform mixing is achieved without dead zones.

2. Process according to claim 1, employing monomers in the gaseous form or liquefiable monomers capable of being injected in the polymerization zone, said monomers being used jointly or not with inert gases and/or chain regulating gases, such as hydrogen, acting on the transfer reactions.

3. Process according to claim 1, comprising operating at pressures lower than atmospheric pressure and reaching 500 atmospheres or more, the prefered range being between about 1 and 80 atmospheres.

4. Process according to claim 1, comprising operating at temperatures below room temperature and ranging up to 250° C. or more, the preferred range being between about room temperature and 150° C.

5. Process according to claim 1, wherein said monomers are ethylenically unsaturated hydrocarbons, there being preferred, for homopolymerization reactions, ethylene and propylene and olefins having 3 to 18 carbon atoms and, better still, 3 to 8 carbon atoms, including 1-butene, 1-pentene, 4-methyl-1-pentene, 1-heptene, 1-hexene, 1-octene, and mixtures thereof, and, for the copolymerization reactions, those which employ the copolymerization of ethylene and propylene, and the copolymerization of ethylene and/or olefins having 3 to 18 carbon atoms, which may be straight chain or branched chain, for example 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, and mixtures thereof.

6. Process according to claim 1, comprising employing diolefins or conjugated diolefins, in particular dienes such as butadiene, isoprene, 1, 4-hexadiene, 1, 5-hexadiene, vinylnorbornene, ethylidenenorbornene, and dicyclopentadiene, by way of co-monomers and especially termonomers.

7. Process according to claim 1, comprising employing a solid catalyst in the granular or particulate form, for example of the supported Ziegler Natta type, namely a catalyst comprising a compound of transition metal such as Ti, V or Zr in contact with a magnesium compound possibly in the presence of an electron-donator organic compound, it being possible to spread the catalyst thus formed over a porous support of the metal oxide type, the catalytic compound which results from these associations being employed in the presence of a co-catalyst of the alkyl aluminum type or aluminum alcoholate type.

8. Process according to claim 1, comprising employing a solid catalyst in the granular or particulate form, for example of the supported chromium type namely comprising at least a chromium compound spread over a metal oxide-containing porous support, optionally in the presence of other compounds, such as organic compounds of titanium, as the case may be, in the presence of fluorinated salts, said chromium catalysts, before being employed in the polymerization, being activated in dry air at high temperature and after flushing with nitrogen, it being possible to employ the chromium catalyst obtained as such or in the presence of catalysts of the alkyl aluminum or aluminum alcoholate type.

9. Process according to claim 1, comprising effecting the agitation by a turbine unit whose shaped blades are very close to the spherical wall defining the polymerization zone, clearances of 1 to 50 mm being preferred.

10. Process according to claim 1, wherein the turbine unit has blades of such length that the diameter of the circle described by their ends is at least one third of the diameter of the sphere.

11. Process according to claim 1, wherein the blades of the turbine unit extend alongside the spherical wall until they reach an equatorial plane, in which case the diameter of the circle generated by their ends is equal to at least the diameter of the sphere, apart from the clearances, it being possible for the blades to extend even beyond the equatorial plane normal to the axis of rotation.

12. Process according to claim 1, wherein the turbine unit comprises two to eight blades and preferably three blades, arranged symmetrically relative to the agitation axis and shaped in such manner as to ensure a thorough mixing.

13. Process according to claim 1, comprising effecting an additional agitation in the part of the spherical zone of polymerization unoccupied by the turbine unit, by means of either an additional scraper system comprising a plurality of elements, preferably filiform blades, having a symmetry of revolution and shaped in such manner as to avoid disturbing the travel of the gases, or by means of one or more dilacerating turbines for eliminating possible agglomerates.

14. Process according to claim 1, wherein the temperature in the polymerization zone is controlled from the exterior by constructing the spherical walls in the form of a jacket in which a control fluid is made to circulate, and/or from the very interior of the polymerization zone by injecting therein a cooled gas, a compressed fluid cooling by expansion or a liquid which is vaporized under the conditions prevailing inside the polymerization zone.

15. Process according to claim 1, wherein the prepolymerization, homopolymerization and interpolymerization reactions are carried out until a dry powder of polymer is obtained.

16. Process according to claim 1, wherein the polymerization is carried out with a view to control the particle size of the catalyst and to obtain a prepolymer capable of being employed in a subsequent polymerization step.

17. Process according to claim 1, wherein the polymerization is carried out with a view to control the particle size of the catalyst and a subsequent polymerization step is carried out in a gaseous phase or fluid or agitated bed.

* * * * *

UNITED STATES PATENT AND TRADEMARK OFFICE
CERTIFICATE OF CORRECTION

PATENT NO. : 4,467,080
DATED      : August 21, 1984
INVENTOR(S) : Claude Brun et al.

It is certified that error appears in the above-identified patent and that said Letters Patent is hereby corrected as shown below:

On the title page:

Correct the priority data as follows:

[30]  Foreign Priority Data
    [32]  Priority Nov. 30, 1981

Signed and Sealed this

Eighth Day of January 1985

[SEAL]

Attest:

Attesting Officer

GERALD J. MOSSINGHOFF

Commissioner of Patents and Trademarks